United States Patent
Honma et al.

(10) Patent No.: US 11,892,330 B2
(45) Date of Patent: Feb. 6, 2024

(54) SIGNAL DETECTING DEVICE AND OPTICAL FIBER CHARACTERISTICS MEASURING DEVICE

(71) Applicant: Yokogawa Electric Corporation, Tokyo (JP)

(72) Inventors: Masayoshi Honma, Musashino (JP); Shin-Ichirou Tezuka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 18/212,439

(22) Filed: Jun. 21, 2023

(65) Prior Publication Data
US 2024/0003716 A1     Jan. 4, 2024

(30) Foreign Application Priority Data

Jun. 29, 2022    (JP) ................................ 2022-104549

(51) Int. Cl.
*G01D 5/353*      (2006.01)

(52) U.S. Cl.
CPC ..... *G01D 5/35345* (2013.01); *G01D 5/35364* (2013.01)

(58) Field of Classification Search
CPC ........................ G01D 5/35345; G01D 5/35364
See application file for complete search history.

(56) References Cited

U.S. PATENT DOCUMENTS

| 11,326,981 | B2 * | 5/2022 | Furukawa | ............ G01M 11/319 |
| 11,402,296 | B2 * | 8/2022 | Matsuura | ............... G01M 11/31 |
| 2013/0308123 | A1 | 11/2013 | Kishi et al. | |

FOREIGN PATENT DOCUMENTS

| JP | 2012159387 A | 8/2012 |
| JP | 2022014178 A | 1/2022 |

* cited by examiner

*Primary Examiner* — Seung C Sohn
(74) *Attorney, Agent, or Firm* — Osha Bergman Watanabe & Burton LLP (57) ABSTRACT

A signal detecting device includes a multiplier that multiplies a measurement signal by a reference signal, a filter that filters a multiplication result from the multiplier, a first storage that stores an internal state of the filter; and a second storage that stores a filtering result from the filter. The filter filters the multiplication result using the internal state stored in the first storage. The first storage switches an area in or from which the filter writes or reads the internal state in accordance with an index signal representing a type of amplitude of a time-divisional signal in the measurement signal. The second storage switches an area in which the filtering result is stored in accordance with the index signal.

20 Claims, 7 Drawing Sheets

SIGNAL DETECTING DEVICE AND OPTICAL FIBER CHARACTERISTICS MEASURING DEVICE

BACKGROUND

The present invention relates to a signal detecting device and an optical fiber characteristics measuring device.

DESCRIPTION OF THE RELATED ART

Generally, a lock-in amplifier includes a multiplier that multiplies a measurement signal by a reference signal and a low pass filter that extracts a DC component of a signal acquired through multiplication using the multiplier and is a signal detecting device that detects a specific signal included in a measurement signal. Such a lock-in amplifier has a feature of being able to detect a minute signal embedded in noise with high sensitivity. As types of lock-in amplifier, there are an analog type in which a multiplier and a low pass filter are realized using analog circuits and a digital type in which these are realized using digital circuits.

In Japanese Unexamined Patent Application Publication No. 2012-159387 and Japanese Unexamined Patent Application Publication No. 2022-014178, an optical fiber characteristics measuring device including a lock-in amplifier is disclosed. This optical fiber characteristics measuring device is a device that detects a temperature distribution and a distortion distribution in a longitudinal direction of an optical fiber by detecting Brillouin scattering light generated in accordance with light incident to an optical fiber. Brillouin scattering light generated inside an optical fiber is extremely weak, and a lock-in amplifier is used for detecting such weak Brillouin scattering light with high sensitivity.

In a conventional lock-in amplifier, as described above, a DC component is extracted from a signal acquired by multiplying a measurement signal with a reference signal using a low pass filter. For this reason, for example, amplitudes of a signal of which frequencies are the same as a frequency of the reference signal, and the amplitude time-divisionally changes (a time-divisional signal) cannot be separated and detected. Even when a measurement signal including such time-divisional signals is input to a conventional lock-in amplifier, only one output acquired by performing low pass filter processing on the time-divisional signals can be acquired from the conventional lock-in amplifier.

SUMMARY

A signal detecting device may include: a multiplier configured to multiply a measurement signal by a reference signal; a filter processor (a filter) configured to perform filter processing on a multiplication result acquired by the multiplier; a first storage configured to store an internal state of the filter processor; and a second storage configured to store a processing result (a filtering result) acquired by the filter processor. The filter processor may be configured to perform the filter processing using the internal state stored in the first storage. The first storage may be configured to perform switching of an area in/from which the internal state is written/read by the filter processor in accordance with an index signal representing a type of amplitude of a time-divisional signal included in the measurement signal. The second storage may be configured to perform switching of an area in which the processing result acquired by the filter processor is stored in accordance with the index signal.

Further features and aspects of the present disclosure will become apparent from the following detailed description of exemplary embodiments with reference to the attached drawings.

DESCRIPTION OF THE EMBODIMENTS

The embodiments will be now described herein with reference to illustrative embodiments. Those skilled in the art will recognize that many alternative embodiments can be accomplished using the teaching of the present invention and that the present invention is not limited to the embodiments illustrated herein for explanatory purposes.

One or more embodiments provide a signal detecting device capable of separating and detecting amplitudes of a time-divisional signal of which the amplitude time-divisionally changes and an optical fiber characteristics measuring device including the signal detecting device.

Hereinafter, a signal detecting device and an optical fiber characteristics measuring device according to one or more embodiments will be described in detail with reference to the drawings. Hereinafter, first, an overview of one or more embodiments will be described, and subsequently, details of one or more embodiments will be described in detail.

[Overview]

One or more embodiments can separate and detect amplitudes of a time-divisional signal of which the amplitude time-divisionally changes. For example, in the optical fiber characteristics measuring device, in a case in which pulse light is caused to be sequentially incident in an optical fiber, amplitudes of a time-divisional signal acquired by detecting weak Brillouin scattering light sequentially output from the optical fiber are separated and are caused to be detectable.

A lock-in amplifier extracts a DC component from a signal acquired by multiplying a measurement signal by a reference signal using a low pass filter, thereby detecting a minute signal embedded in noise with high sensitivity. In the lock-in amplifier, in a case in which a component of a frequency f included in the measurement signal is extracted, a signal of the frequency f is used as a reference signal. When the measurement signal is multiplied by the reference signal, a DC component and a second harmonic component (a 2f component) can be acquired. In a conventional lock-in amplifier, by extracting only the acquired DC component using a low pass filter, a minute signal embedded in noise is detected with high sensitivity. In addition, a second harmonic component (a 2f component) also can be acquired by using a high pass filter in place of the low pass filter.

When a measurement signal including a time-divisional signal of which an amplitude time-divisionally changes is input to such a conventional lock-in amplifier, only one output acquired by performing low pass filter processing on a time-divisional signal can be acquired from the conventional lock-in amplifier. For this reason, each of amplitudes of a time-divisional signal cannot be separated and detected by the conventional lock-in amplifier.

A signal detecting device according to one or more embodiments includes a multiplier multiplying a measurement signal with a reference signal, a filter processor (a filter) performing filter processing on a multiplication result acquired by the multiplier, a first storage storing an internal state of the filter processor, and a second storage storing a processing result acquired by the filter processor. The filter processor performs filter processing using an internal state stored in the first storage. The first storage performs switching of an area into/from which an internal state is written/read by the filter processor in accordance with an index signal representing a type of amplitude of a time-divisional signal included in a measurement signal. The second storage performs switching of an area in which a processing result acquired by the filter processor is stored in accordance with an index signal. In accordance with this, amplitudes of a time-divisional signal of which the amplitude time-divisionally changes can be separated and detected.

[Signal detecting device]

First Example

Figure 1:
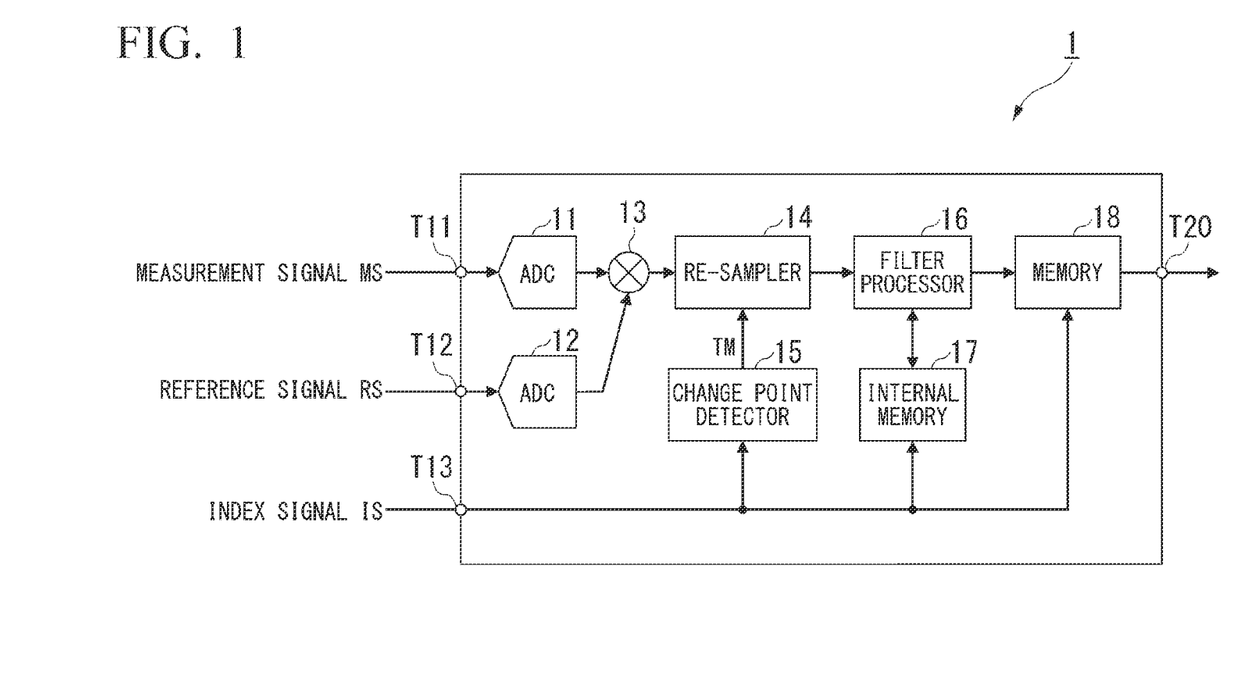
FIG. 1 is a block diagram illustrating a main configuration of a signal detecting device according to a first example.

FIG. 1 is a block diagram illustrating a main configuration of a signal detecting device according to a first example. As illustrated in FIG. 1, the signal detecting device 1 according to this example includes an ADC (an analog/digital converter) 11 (a first converter), an ADC 12 (a second converter), a multiplier 13, a re-sampler 14, a change point detector 15 (a detector), a filter processor 16, an internal memory 17 (a first storage), and a memory 18 (a second storage).

A measurement signal MS, a reference signal RS, and an index signal IS are input to the signal detecting device 1. The signal detecting device 1 separates and detects amplitudes of the time-divisional signal DS (see FIG. 2A) included in the measurement signal MS using the reference signal RS and the index signal IS. In addition, the signal detecting device 1 includes a measurement signal input terminal T11 to which the measurement signal MS is input, a reference signal input terminal T12 to which the reference signal RS is input, an index signal input terminal T13 to which the index signal IS is input, and an output terminal T20 to which a detected amplitude is output.

Figure 2A:
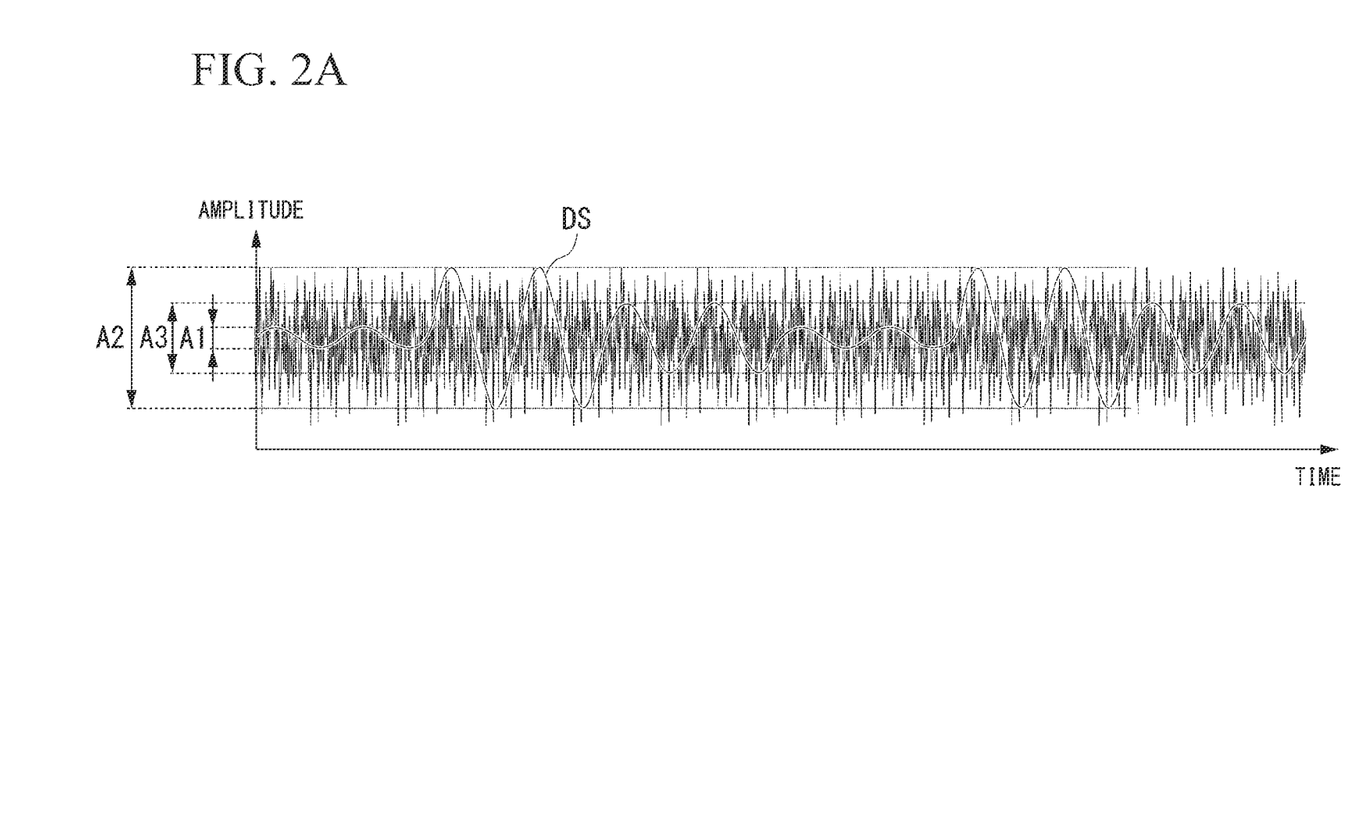
FIG. 2A is a diagram illustrating an example of a measurement signal input to the signal detecting device according to the first example.
Figure 2B:
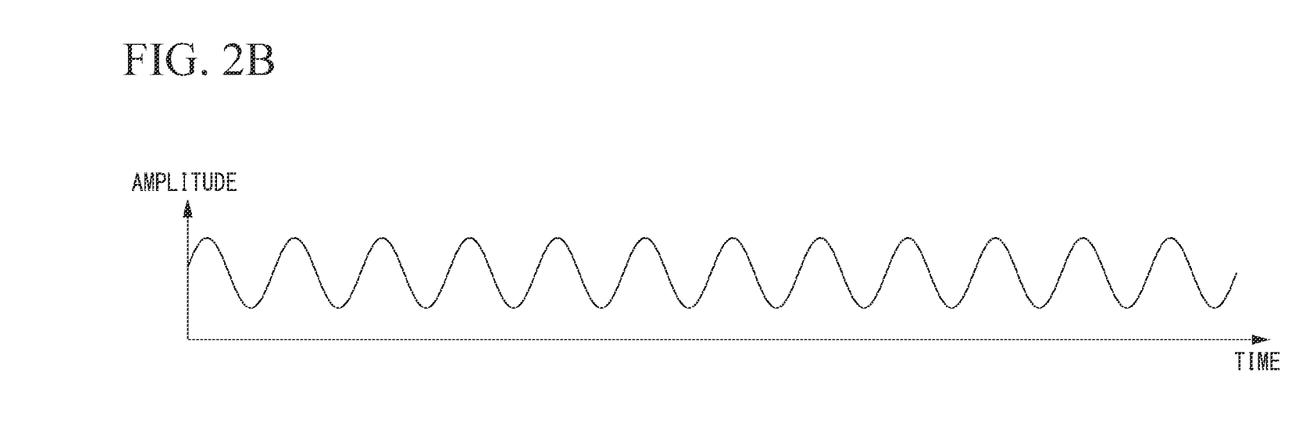
FIG. 2B is a diagram illustrating an example of a reference signal input to the signal detecting device according to the first example.
Figure 2C:
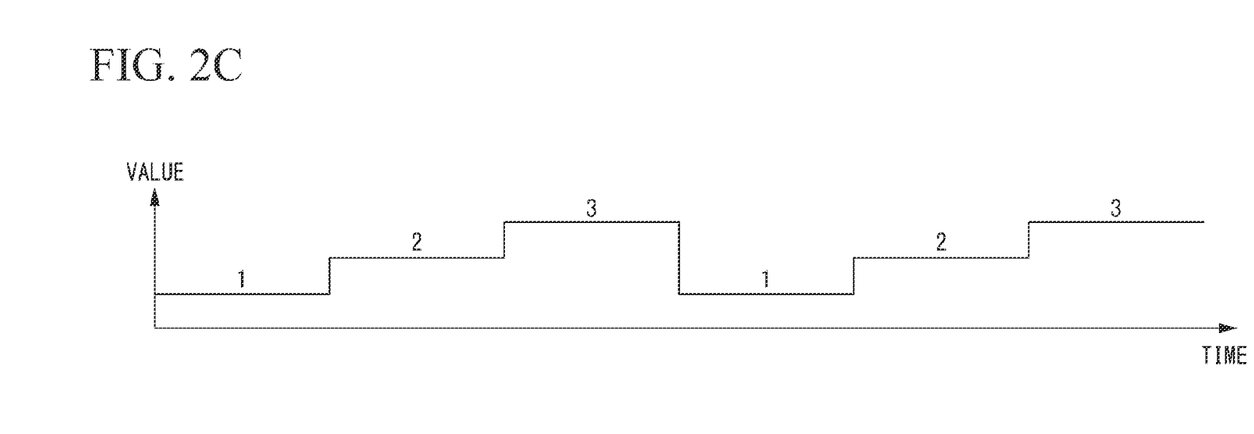
FIG. 2C is a diagram illustrating an example of an index signal input to the signal detecting device according to the first example.

FIG. 2A to 2C are diagrams illustrating examples of signals input to the signal detecting device according to the first example. FIG. 2A is a diagram illustrating an example of the measurement signal MS, FIG. 2B is a diagram illustrating an example of the reference signal RS, and FIG. 2C is a diagram illustrating an example of the index signal IS. As illustrated in FIG. 2A, the measurement signal MS is an analog signal including a time-divisional signal DS of which an amplitude time-divisionally changes. The time-divisional signal DS illustrated in FIG. 2A is a signal of which an amplitude sequentially changes to A1, A2, and A3 for every two periods and is a weak signal, and thus a noise is superimposed thereon. In addition, for example, the frequency of the time-divisional signal DS is several to several tens of megahertz [MHz].

As illustrated in FIG. 2B, the reference signal RS is an analog signal that has the same frequency as that of the time-divisional signal DS included in the measurement signal MS and is synchronized with the time-divisional signal DS. As illustrated in FIG. 2C, the index signal IS is a signal that represents a type of amplitude of the time-divisional signal DS included in the measurement signal MS and is synchronized with the time-divisional signal DS. The index signal IS illustrated in FIG. 2C represents that a type of amplitude A1 of the time-divisional signal DS is "1", a type of amplitude A2 of the time-divisional signal DS is "2", and a type of amplitude A3 of the time-divisional signal DS is "3". The index signal IS is a digital signal of a plurality of bits (for example, 16 bits).

In the examples illustrated in FIGS. 2A to 2C, for simplification of description, although a case in which the amplitude of the time-divisional signal DS is three types (amplitudes A1, A2, and A3) is illustrated as an example, the amplitude of the time-divisional signal DS may be two types or four or more types. In a case in which the index signal IS is of 16 bits, the number of types of amplitudes of the time-divisional signal DS that can be detected by the signal detecting device 1 is a maximum of 65,536 types ($=2^{16}$ types).

The ADC 11 converts a measurement signal MS input from the measurement signal input terminal T11 into a digital signal. The ADC 12 converts a reference signal RS input from the reference signal input terminal T12 into a digital signal. The multiplier 13 multiplies the measurement signal MS converted into the digital signal by the ADC 11 with the reference signal RS converted into the digital signal by the ADC 12. For example, the sampling frequency of the ADCs 11 and 12 is several hundreds of megahertz [MHz].

When a timing signal TM is output from the change point detector 15, the re-sampler 14 resamples a multiplication result acquired by the multiplier 13. Here, a first reason for disposing the re-sampler 14 is that processing timings after the re-sampler 14 can be aligned at time-divisional timings of the time-divisional signal DS, and thus processing can be easily performed. A second reason for disposing the re-sampler 14 is that a DC component included in a multiplication result acquired by the multiplier 13 is finally detected by the signal detecting device 1, and thus there is no problem even in a case in which a high frequency component disappears in accordance with re-sampling. For example, a sampling frequency (a re-sampling frequency) of the re-sampler 14 is several to several tens of megahertz [MHz]. In addition, the re-sampler 14 performs an aliasing noise countermeasure such as a low pass filter processing passing a frequency component of frequencies equal to or lower than ½ of the re-sampling frequency on original data (a multiplication result acquired by the multiplier 13) or the like and then performs data thinning.

The change point detector 15 detects a timing at which the index signal IS changes. More specifically, the change point detector 15 detects a change in the value of the index signal IS and, in a case in which a change thereof has been detected, outputs a timing signal TM at that timing. As described above, the re-sampler 14 resamples a multiplication result acquired by the multiplier 13 when the timing signal TM is output from the change point detector 15. For this reason, the re-sampler 14 can be regarded to re-sample a multiplication result acquired by the multiplier 13 at a timing detected by the change point detector 15.

The filter processor 16 performs filter processing on a multiplication result, which has been acquired by the multiplier 13, re-sampled by the re-sampler 14. For example, as the filter processing described above, the filter processor 16 performs a process using an infinite impulse response (IIR) low pass filter. In addition, as the filter processing described above, the filter processor 16 may perform a process using a finite impulse response (FIR) low pass filter. In a case in which the infinite impulse response low pass filter is used, an internal state quantity can be configured to be smaller than that in a case in which the finite impulse response low pass filter is used. For this reason, when a processing load of the filter processor 16 and the capacity of the internal memory 17 are considered, it is more preferable to use the infinite impulse response low pass filter than the finite impulse response low pass filter.

The internal memory 17 is a memory that stores an internal state of the filter processor 16. The internal memory 17 performs switching of an area of which an internal state is written and read using the filter processor 16 in accordance with the index signal IS. The memory 18 is a memory that stores a processing result acquired by the filter processor 16. The memory 18 performs switching of an area in which the processing result acquired by the filter processor 16 is stored in accordance with the index signal IS.

Figure 3A:
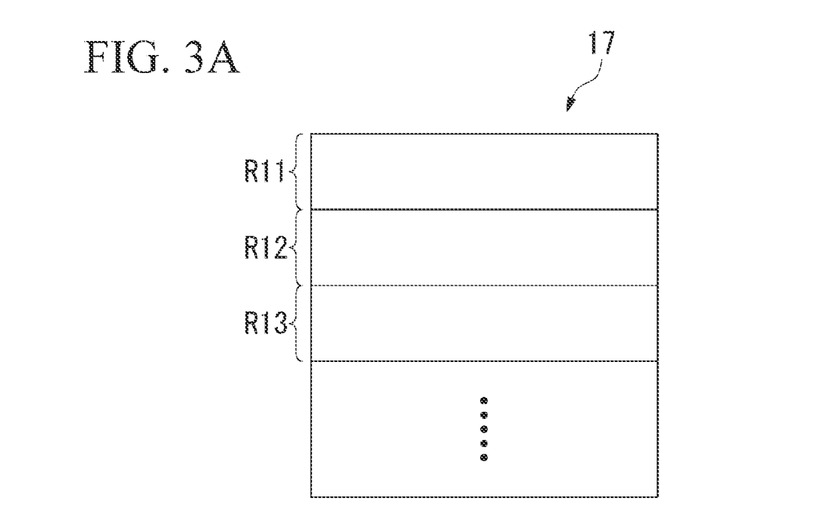
FIG. 3A is a diagram illustrating an example of a memory map of the internal memory according to the first example.
Figure 3B:
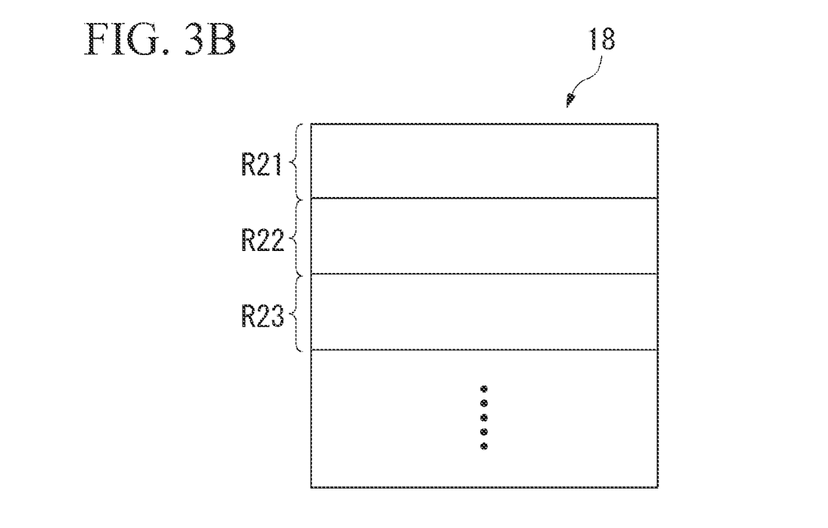
FIG. 3B is a diagram illustrating an example of a memory map of the memory according to the first example.

FIGS. 3A and 3B are diagrams illustrating examples of a memory map of the signal detecting device according to the first example. FIG. 3A is a diagram illustrating a memory map of the internal memory 17, and FIG. 3B is a diagram illustrating a memory map of the memory 18. As illustrated in FIGS. 3A and 3B, in each of the internal memory 17 and the memory 18, three areas are disposed in accordance with types of amplitude (amplitudes A1, A2, and A3) of the time-divisional signal DS.

An area R11 illustrated in FIG. 3A, for example, is an area in/from which an internal state is written/read by the filter processor 16 in a case in which the index signal IS is "1". An area R12, for example, is an area in/from which an internal state is written/read by the filter processor 16 in a case in which the index signal IS is "2". An area R13, for example, is an area in/from which an internal state is written/read by the filter processor 16 in a case in which the index signal IS is "3".

An area R21 illustrated in FIG. 3B, for example, is an area in which a processing result acquired by the filter processor 16 is stored in a case in which the index signal IS is "1". An area R22, for example, is an area in which a processing result acquired by the filter processor 16 is stored in a case in which the index signal IS is "2". An area R23, for example, is an area in which a processing result acquired by the filter processor 16 is stored in a case in which the index signal IS is "3".

In other words, in a case in which filter processing for the time-divisional signal DS of which an amplitude is amplitude A1 illustrated in FIG. 2A is performed, an internal state stored in the area R11 illustrated in FIG. 3A is used, and a processing result is stored in the area R21 illustrated in FIG. 3B. In a case in which filter processing for the time-divisional signal DS of which an amplitude is amplitude A2 illustrated in FIG. 2A is performed, an internal state stored in the area R12 illustrated in FIG. 3A is used, and a processing result is stored in the area R22 illustrated in FIG. 3B. In a case in which filter processing for the time-divisional signal DS of which an amplitude is amplitude A3 illustrated in FIG. 2A is performed, an internal state stored in the area R13 illustrated in FIG. 3A is used, and a processing result is stored in the area R23 illustrated in FIG. 3B.

As illustrated in FIGS. 3A and 3B, the number of areas disposed in each of the internal memory 17 and the memory 18 is a number corresponding to types of amplitudes of the time-divisional signal DS. In a case in which the types of amplitude of the time-divisional signal DS are huge, the number of areas disposed in the internal memory 17 and the memory 18 also become huge. In such a case, it can be handled by increasing the capacity of each of the internal memory 17 and the memory 18.

Next, an operation of the signal detecting device 1 in the configuration described above will be described. When the operation of the signal detecting device 1 starts, a measurement signal MS, a reference signal RS, and an index signal IS are respectively input from the measurement signal input terminal T11, the reference signal input terminal T12, and the index signal input terminal T13. The time-divisional signal DS, the reference signal RS, and the index signal IS included in the measurement signal MS are synchronized with each other.

The measurement signal MS input from the measurement signal input terminal T11 is converted into a digital signal by the ADC 11, and the reference signal RS input from the reference signal input terminal T12 is converted into a digital signal by the ADC 12. The measurement signal MS and the reference signal RS converted into the digital signals are multiplied with each other by the multiplier 13.

On the other hand, the index signal IS input from the index signal input terminal T13 is input to the change point detector 15, and a change in the value thereof is detected. When a change in the value is detected by the change point detector 15, a timing signal TM is output from the change point detector 15 to the re-sampler 14. In addition, the index signal IS is input to the internal memory 17 and the memory 18, and an area for storing an internal state of the filter processor 16 and an area for storing a processing result acquired by the filter processor 16 are set in each thereof.

For example, it is assumed that the input index signal IS input from the index signal input terminal T13 is "1". At this time, as an area for storing the internal state of the filter processor 16, for example, the area R11 of the internal memory 17 illustrated in FIG. 3A is set. In addition, as an area for storing a processing result acquired by the filter processor 16, for example, the area R21 of the memory 18 illustrated in FIG. 3B is set.

A multiplication result acquired by the multiplier 13 is input to the re-sampler 14 and is re-sampled with a timing of the timing signal TM output from the change point detector 15. The multiplication result, which has been acquired by the multiplier 13, re-sampled by the re-sampler 14 is input to the filter processor 16, and filter processing is performed thereon. More specifically, the filter processor 16 performs a process of extracting a DC component by performing a process using an infinite impulse response low pass filter.

In a case in which an internal state is stored in an area (here, the area R11 illustrated in FIG. 3A) of the internal memory 17 set in accordance with the index signal IS, the filter processor 16 reads the internal state and performs the filter processing described above. Internal states of the filter processor 16 are sequentially written into an area (here, the area R11 illustrated in FIG. 3A) of the internal memory 17 set in accordance with the index signal IS.

A processing result (an extracted DC component) acquired by the filter processor 16 is stored in an area (here, the area R21 illustrated in FIG. 3B) of the memory 18 set in accordance with the index signal IS. The DC component extracted here represents a magnitude of the amplitude A1 illustrated in FIG. 2A.

Next, the index signal IS input from the index signal input terminal T13 is assumed to change from "1" to "2". Then, the change of the value is detected by the change point detector 15, and a timing signal TM is output from the change point detector 15 to the re-sampler 14. Then, in the re-sampler 14, a multiplication result acquired by the multiplier 13 is re-sampled with the timing of the timing signal TM.

In addition, in accordance with the change of the index signal IS, the area for storing the internal state of the filter processor 16 and the area for storing a processing result acquired by the filter processor 16 are newly set. More specifically, in a case in which the index signal IS has changed to "2", as the area for storing the internal state of the filter processor 16, for example, the area R12 of the internal memory 17 illustrated in FIG. 3A is newly set. In addition, as the area for storing the processing result acquired by the filter processor 16, for example, the area R22 of the memory 18 illustrated in FIG. 3B is newly set.

The multiplication result, which has been acquired by the multiplier 13, re-sampled by the re-sampler 14 is input to the filter processor 16, and filter processing is performed thereon. Here, in a case in which the internal state is stored in an area (hereinafter, the area R12 illustrated in FIG. 3A) of the internal memory 17 set in accordance with the index signal IS, the filter processor 16 reads the internal state and performs the filter processing described above. In addition, internal states of the filter processor 16 are sequentially written into an area (here, the area R12 illustrated in FIG. 3A) of the internal memory 17 set in accordance with the index signal IS.

A processing result (an extracted DC component) acquired by the filter processor 16 is stored in an area (here, the area R22 illustrated in FIG. 3B) of the memory 18 set in accordance with the index signal IS. The DC component extracted here represents a magnitude of the amplitude A2 illustrated in FIG. 2A.

Next, the index signal IS input from the index signal input terminal T13 is assumed to change from "2" to "3". Then, the change of the value is detected by the change point detector 15, and a timing signal TM is output from the change point detector 15 to the re-sampler 14. Then, in the re-sampler 14, a multiplication result acquired by the multiplier 13 is re-sampled with the timing of the timing signal TM.

In addition, in accordance with the change of the index signal IS, the area for storing the internal state of the filter processor 16 and the area for storing a processing result acquired by the filter processor 16 are newly set. More specifically, in a case in which the index signal IS has changed to "3", as the area for storing the internal state of the filter processor 16, for example, the area R13 of the internal memory 17 illustrated in FIG. 3A is newly set. In addition, as the area for storing the processing result acquired by the filter processor 16, for example, the area R23 of the memory 18 illustrated in FIG. 3B is newly set.

The multiplication result, which has been acquired by the multiplier 13, re-sampled by the re-sampler 14 is input to the filter processor 16, and filter processing is performed thereon. Here, in a case in which the internal state is stored in an area (hereinafter, the area R13 illustrated in FIG. 3A) of the internal memory 17 set in accordance with the index signal IS, the filter processor 16 reads the internal state and performs the filter processing described above. In addition, internal states of the filter processor 16 are sequentially written into an area (here, the area R13 illustrated in FIG. 3A) of the internal memory 17 set in accordance with the index signal IS.

A processing result (an extracted DC component) acquired by the filter processor 16 is stored in an area (here, the area R23 illustrated in FIG. 3B) of the memory 18 set in accordance with the index signal IS. The DC component extracted here represents a magnitude of the amplitude A3 illustrated in FIG. 2A.

Hereinafter, similarly, when the value of the index signal IS changes, a multiplication result acquired by the multiplier 13 is re-sampled with the timing, and an area for storing the internal state of the filter processor 16 and an area for storing a processing result acquired by the filter processor 16 are set. Here, in a case in which an area according to the value of the index signal IS has been set in advance, the area is set as an area for storing the internal state of the filter processor 16 and an area for storing a processing result acquired by the filter processor 16. On the other hand, in a case in which an area according to the value of the index signal IS has not been set, an area for storing the internal state of the filter processor 16 and an area for storing a processing result acquired by the filter processor 16 are newly set.

For example, the value of the index signal IS is assumed to change to "1" again. Then, for example, the area R11 of the internal memory 17 illustrated in FIG. 3A and the area R21 of the memory 18 illustrated in FIG. 3B are respectively set as an area for storing the internal state of the filter processor 16 and an area for storing a processing result acquired by the filter processor 16. On the other hand, for example, the value of the index signal IS is assumed to become a new value "4". Then, as an area for storing the internal state of the filter processor 16, for example, an area other than the areas R11 to R13 of the internal memory 17 illustrated in FIG. 3A is newly set. In addition, as an area for storing a processing result acquired by the filter processor 16, for example, an area other than the areas R21 to R23 of the memory 18 illustrated in FIG. 3B is newly set.

By performing the process described above, values representing magnitudes of the amplitudes A1, A2, and A3 of the time-divisional signal DS illustrated in FIG. 2A are stored in mutually-different areas of the memory 18. For example, a value representing a magnitude of the amplitude A1 is stored in the area R21 of the memory 18, a value representing the magnitude of the amplitude A2 is stored in the area R22 of the memory 18, and a value representing the magnitude of the amplitude A3 is stored in the area R23 of the memory 18 (see FIG. 3B).

For example, each of values stored in mutually-different areas of the memory 18 can be read by designating a read address of the memory 18. A value read from the memory 18 is output from the output terminal T20 of the signal detecting device 1. In this way, each of amplitudes of a time-divisional signal DS included in a measurement signal MS are separated and detected.

As described above, this example includes the multiplier 13 that multiplies a measurement signal MS by a reference signal RS and the filter processor 16 that performs filter processing on a multiplication result acquired by the multiplier 13. In addition, this example includes the internal memory 17 that stores an internal state of the filter processor 16 and the memory 18 that stores a processing result acquired by the filter processor 16. Then, the filter processor 16 performs filter processing using the internal state stored in the internal memory 17. The internal memory 17 performs switching of an area in/from which an internal state is written/read using the filter processor 16 in accordance with an index signal IS representing a type of amplitude of a time-divisional signal DS included in a measurement signal MS. The memory 18 performs switching of an area in which a processing result acquired by the filter processor 16 is stored in accordance with the index signal IS. In accordance with this, each of amplitudes of a time-divisional signal DS of which the amplitude time-divisionally changes can be separated and detected.

Second Example

Figure 4:
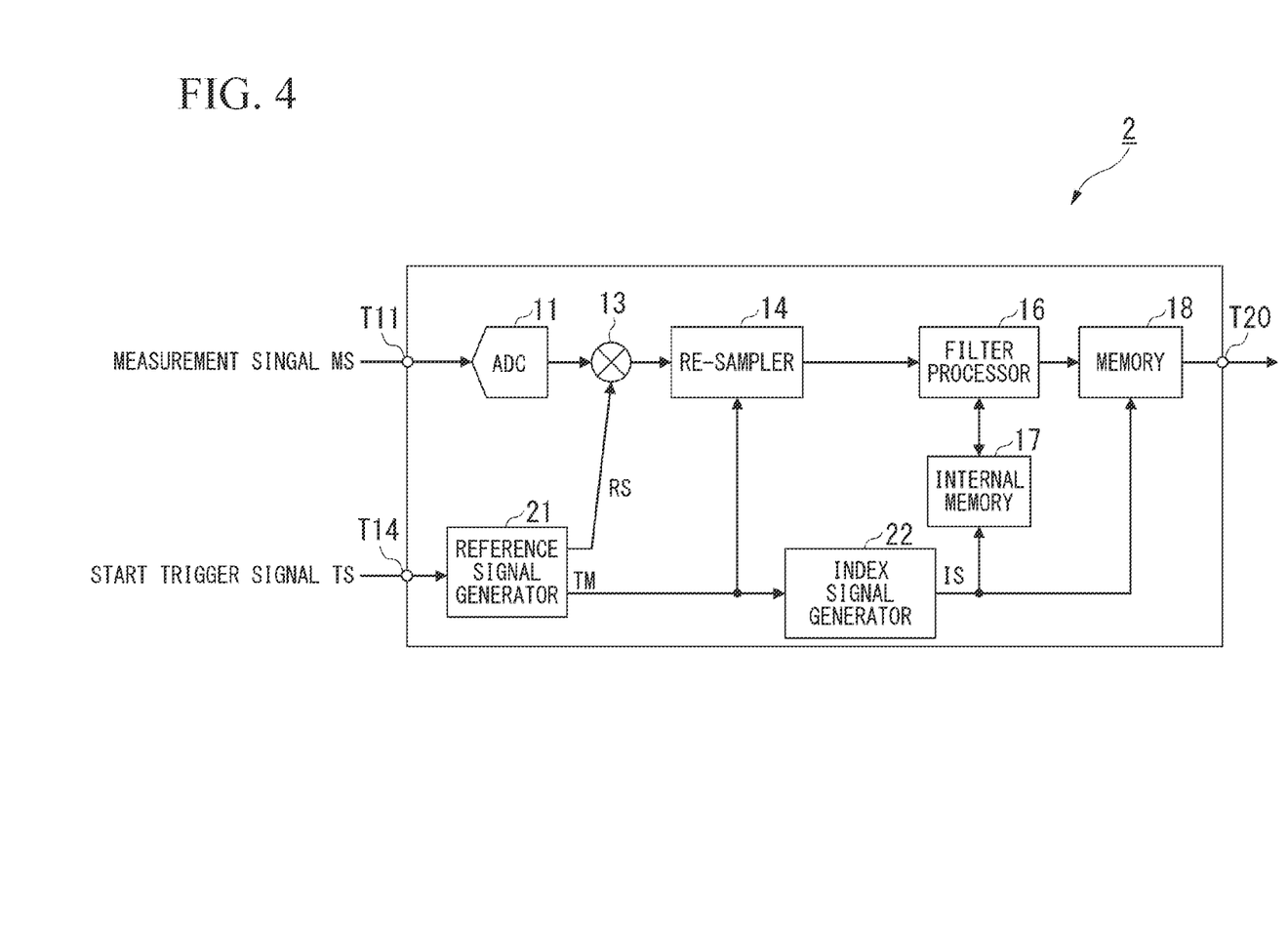
FIG. 4 is a block diagram illustrating a main configuration of a signal detecting device according to a second example.

FIG. 4 is a block diagram illustrating a main configuration of a signal detecting device according to a second example. In FIG. 4, the same reference signs will be assigned to the same blocks as the blocks illustrated in FIG. 1. As illustrated in FIG. 4, the signal detecting device 2 according to this example has a configuration in which the ADC 12 and the change point detector 15 of the signal detecting device 1 illustrated in FIG. 1 are omitted, and a reference signal generator 21 (a first generator) and an index signal generator 22 (a second generator) are added.

A measurement signal MS and a start trigger signal TS are input to the signal detecting device 2. The start trigger signal TS is a signal that defines a start timing of a time-divisional signal DS included in a measurement signal MS. The signal detecting device 2 generates a reference signal RS and an index signal IS from the start trigger signal TS and separates and detects amplitudes of the time-divisional signal DS (see FIG. 2A) included in the measurement signal MS using the reference signal RS and the index signal IS that have been generated.

The signal detecting device 2 according to this example has such a premise that a frequency of the time-divisional signal DS, a period at which the amplitude of the time-divisional signal DS changes, and types of amplitude of the time-divisional signal DS are known. In the signal detecting device 2, the reference signal input terminal T12 and the index signal input terminal T13 illustrated in FIG. 1 are omitted, and a start trigger signal input terminal T14 to which the start trigger signal TS is input is included.

The reference signal generator 21 starts generation of a reference signal RS at a timing at which the start trigger signal TS is input from the start trigger signal input terminal T14. The reference signal RS generated by the reference signal generator 21 is a digital signal having the same frequency as the frequency of the time-divisional signal DS that is known. After the start trigger signal TS is input, the reference signal generator 21 generates a timing signal TM every time a period with which the amplitude of the time-divisional signal DS that is known changes elapses. This timing signal TM is a signal representing a division timing of the time-divisional signal DS and is input to the re-sampler 14 and the index signal generator 22. In addition, the timing signal TM can be regarded as a signal similar to the timing signal TM output from the change point detector 15 in the first example.

The index signal generator 22 generates an index signal IS on the basis of the timing signal TM generated by the reference signal generator 21. For example, a case in which the number of types of amplitude of the time-divisional signal DS, which is known, is "3" will be described. In this case, similar to the index signal IS illustrated in FIG. 2C, when a timing signal TM is output from the reference signal generator 21, the index signal generator 22 generates an index signal IS changing to "1", "2", "3", "1", "2", . . . .

An operation of the signal detecting device 2 in the configuration is basically similar to the operation of the signal detecting device 1 according to the first example except that a reference signal RS and an index signal IS are generated inside the signal detecting device 2 on the basis of the start trigger signal TS. For this reason, here, the operation of the signal detecting device 2 will be briefly described.

When the operation of the signal detecting device 2 starts, a measurement signal MS and a start trigger signal TS are respectively input from the measurement signal input terminal T11 and the start trigger signal input terminal T14. The time-divisional signal DS included in the measurement signal MS and the start trigger signal TS are synchronized with each other.

The measurement signal MS input from the measurement signal input terminal T11 is converted into a digital signal by the ADC 11. The start trigger signal TS input from the start trigger signal input terminal T14 is input to the reference signal generator 21. In accordance with this, in the reference signal generator 21, generation of a reference signal RS as a digital signal starts at a timing at which the start trigger signal TS is input. The measurement signal MS converted into the digital signal is multiplied by the reference signal RS generated by the reference signal generator 21 using the multiplier 13.

In addition, after the start trigger signal TS is input, every time a period in which the amplitude of the time-divisional signal DS changes elapses, a timing signal TM is generated by the reference signal generator 21. This timing signal TM is input to the re-sampler 14 and is input to the index signal generator 22. When the timing signal TM is input to the re-sampler 14, a multiplication result acquired by the multiplier 13 is re-sampled with a timing of the timing signal TM by the re-sampler 14. On the other hand, when the timing signal TM is input to the index signal generator 22, an index signal IS is generated by the index signal generator 22.

The multiplication result, which has been acquired by the multiplier 13, re-sampled by the re-sampler 14 is input to the filter processor 16, and filter processing is performed thereon. On the other hand, the index signal IS generated by the index signal generator 22 is input to the internal memory 17 and the memory 18, and, similar to the first example, an area for storing the internal state of the filter processor 16 and an area for storing the processing result acquired by the filter processor 16 are set.

When a timing signal TM is generated by the reference signal generator 21, the value of the index signal IS generated by the index signal generator 22 changes. In accordance with this, the area for storing the internal state of the filter processor 16 in the internal memory 17 and the area for storing the processing result acquired by the filter processor 16 in the memory 18 are sequentially switched. By performing such a process, similar to the first example, values representing magnitudes of the amplitudes A1, A2, and A3 of the time-divisional signal DS illustrated in FIG. 2A are stored in mutually-different areas of the memory 18.

Also in this example, for example, each of the values stored in the different areas of the memory 18 can be read by designating a read address of the memory 18. The value read from the memory 18 is output from an output terminal T20 of the signal detecting device 2. In this way, amplitudes of the time-divisional signal DS included in the measurement signal MS are separated and detected.

As described above, this example includes the multiplier 13 that multiplies a measurement signal MS by a reference signal RS and the filter processor 16 that performs filter processing on a multiplication result acquired by the multiplier 13. In addition, this example includes the internal memory 17 that stores an internal state of the filter processor 16 and the memory 18 that stores a processing result acquired by the filter processor 16. Furthermore, this example includes the reference signal generator 21 that generates a reference signal RS on the basis of the start trigger signal TS and generates a timing signal TM and the index signal generator 22 that generates an index signal IS on the basis of the timing signal TM.

Then, the filter processor 16 performs filter processing using the internal state stored in the internal memory 17. The internal memory 17 performs switching of an area of which an internal state is written and read using the filter processor 16 in accordance with the index signal IS generated by the index signal generator 22. The memory 18 performs switching of an area in which the processing result acquired by the filter processor 16 is stored in accordance with the index signal IS generated by the index signal generator 22. In accordance with this, amplitudes of the time-divisional signal DS of which the amplitude time-divisionally changes can be separated and detected.

In addition, in this example, a reference signal RS and an index signal IS are generated inside the signal detecting device 2 on the basis of the start trigger signal TS input from the outside. In accordance with this, the number of signals input to the signal detecting device 2 can be reduced from the number of signals input to the signal detecting device 1, and a noise and a jitter can be reduced. Such a signal detecting device 2 can be expected to exhibit performance higher than that of the signal detecting device 1.

[Optical Fiber Characteristics Measuring Device]

Figure 5:
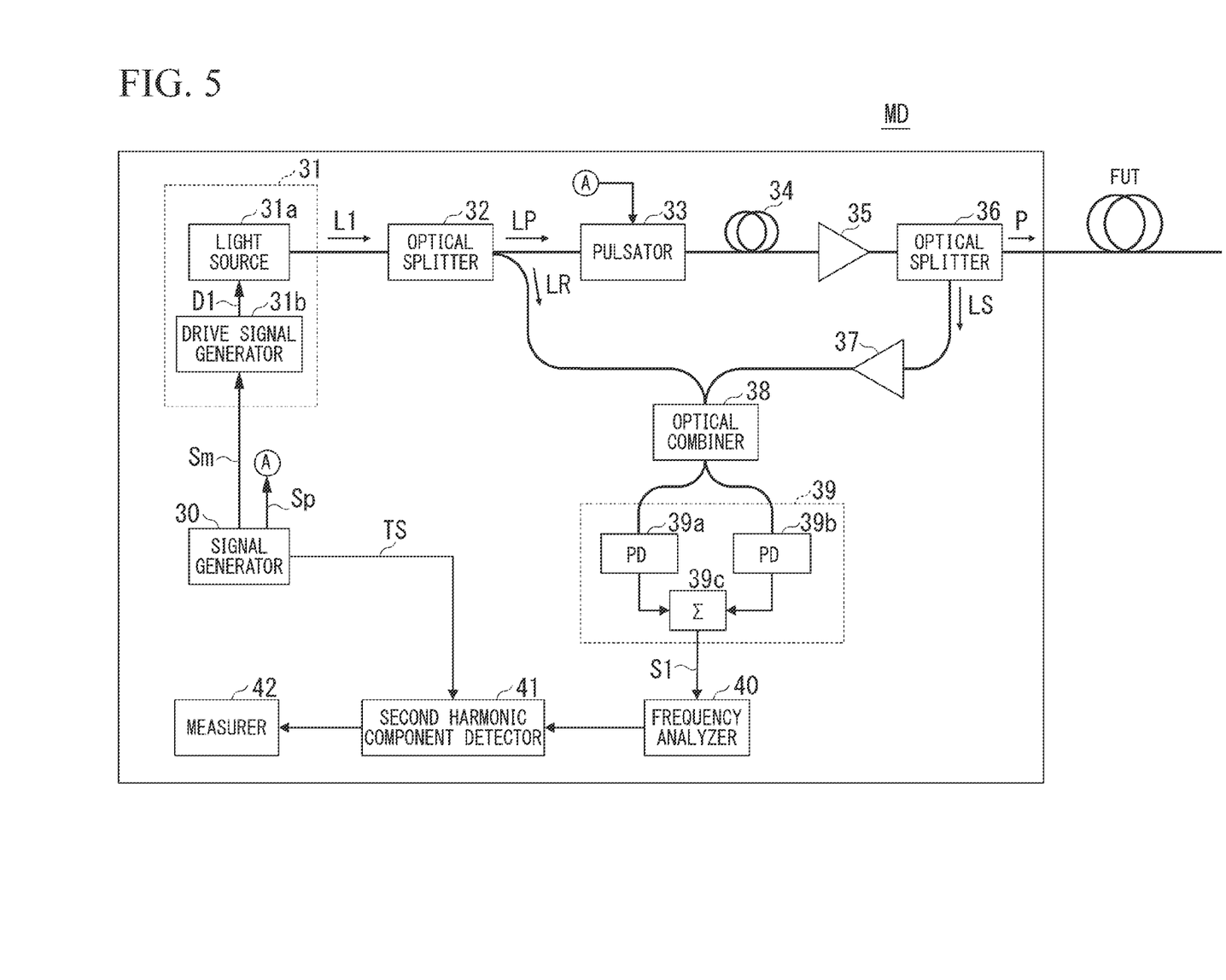
FIG. 5 is a block diagram illustrating a main configuration of an optical fiber characteristics measuring device according to one or more embodiments.

FIG. 5 is a block diagram illustrating a main configuration of an optical fiber characteristics measuring device according to one or more embodiments. As illustrated in FIG. 5, the optical fiber characteristics measuring device MD according to this example includes a signal generator 30, a light source 31, an optical splitter 32 (a first optical splitter), a pulsator 33, a light delayer 34, a light amplifier 35, an optical splitter 36 (a second optical splitter), a light amplifier 37, an optical combiner 38, a light detector 39 (a first detector), a frequency analyzer 40 (an analyzer), a second harmonic component detector 41 (a second detector), and a measurer 42.

The optical fiber characteristics measuring device MD according to this example is an optical fiber characteristics measuring device using a so-called Brillouin optical correlation domain reflectometry (BOCDR) method measuring characteristics of an optical fiber under test FUT on the basis of Brillouin scattering light LS acquired by causing pump pulse light P to be incident in the optical fiber under test FUT. In addition, the pump pulse light P described above is acquired by performing pulsation of pump light LP as continuous light for which frequency modulation has been performed. The Brillouin scattering light LS is rear-side scattering light generated in accordance with Brillouin scattering inside an optical fiber under test FUT.

As the optical fiber under test FUT, an arbitrary optical fiber can be used in accordance with a wavelength and the like of pump pulse light P. In this example, it is assumed that a length of the optical fiber under test FUT is longer than an interval dm of correlation peaks, and a plurality of correlation peaks are present in the optical fiber FUT under test.

The signal generator 30 generates a modulation signal Sm supplied to the light source 31, a pulsation signal Sp supplied to the pulsator 33, and a start trigger signal TS supplied to the second harmonic component detector 41. The modulation signal Sm is a signal used for outputting continuous light L1 (modulation light) for which frequency modulated has been performed from the light source 31. A frequency (a modulation frequency fm) of the modulation signal Sm is swept in a frequency range defined in advance. The pulsation signal Sp is a signal for pulsating the pump light LP as continuous light. The start trigger signal TS is a signal that causes the second harmonic component detector 41 to start detection of a second harmonic component included in a Brillouin gain spectrum acquired by the frequency analyzer 40.

The light source 31 includes a light source 31a and a drive signal generator 31b and outputs continuous light L1 for which frequency modulation has been performed using a modulation signal Sm output from the signal generator 30. The light source 31a, for example, includes a semiconductor laser element such as a distributed feed-back laser diode (DFB-LD) and outputs continuous light L1 for which frequency modulation has been performed in accordance with a drive signal D1 output from the drive signal generator 31b. The drive signal generator 31b generates a drive signal D1 used for outputting the frequency-modulated continuous light L1 from the light source 31a using the modulation signal Sm output from the signal generator 30.

The optical splitter 32 splits continuous light L1 output from the light source 31 into pump light LP and reference light LR having an intensity ratio defined in advance (for example, 1:1). The pulsator 33 pulsates pump light LP split by the first optical splitter 32 using a pulsation signal Sp output from the signal generator 30. The reason for disposing the pulsator 33 is to acquire pump light P used in a time gate method.

The light delayer 34 delays pump light LP formed as a pulse (pump pulse light P) by the pulsator 33 by a predetermined time. The light delayer 34, for example, includes an optical fiber of a predetermined length. By changing the length of the optical fiber, the delay time can be adjusted. The reason for disposing the light delayer 34 is to dispose a 0-order correlation peak, of which an appearing position does not move even when sweeping of the modulation frequency fm is performed, outside the optical fiber under test FUT.

The light amplifier 35 amplifies the pump pulse light P through the light delayer 34. This light amplifier 35, for example, includes a light amplifier such as an Erbium doped fiber amplifier (EDFA) and amplifies the pump pulse light P with a predetermined amplification factor.

The optical splitter 36 includes a first port, a second port, and a third port. The first port is connected to the light amplifier 35. The second port is connected to the optical fiber under test FUT. The third port is connected to the light amplifier 37. The optical splitter 36 outputs pump pulse light P input from the first port to the second port. In addition, the optical splitter 36 outputs Brillouin scattering light LS from the optical fiber under test FUT, which is input from the second port, to the third port. As such an optical splitter 36, for example, an optical circulator can be used.

The light amplifier 37 amplifies Brillouin scattering light LS output from the third port of the optical splitter 36. Similar to the light amplifier 35, this light amplifier 37, for example, includes a light amplifier such as an EDFA and amplifies the Brillouin scattering light LS output from the third port of the optical splitter 36 with a predetermined amplification factor.

The optical combiner 38 combines the Brillouin scattering light LS amplified by the light amplifier 37 and the reference light LR split by the optical splitter 32. In addition, the optical combiner 38 splits the combined light into two pieces of light having an intensity ratio (for example, 1:1) defined in advance and outputs the light to the light detector 39. The two pieces of light split by the optical combiner 38, for example, includes 50% of rear-side scattering light from the optical fiber under test FUT and 50% of reference light. As such an optical combiner 38, for example, an optical coupler can be used.

The light detector 39 causes the Brillouin scattering light LS and the reference light LR included in two pieces of light output from the optical combiner 38 to interfere with each other, thereby performing optical heterodyne detection. The light detector 39, for example, includes a balanced photodiode formed from two photo diodes (PDs) 39a and 39b and an adder 39c. The photodiodes 39a and 39b receive two pieces of light output from the optical combiner 38. Light reception signals of the photodiodes 39a and 39b are input to the adder 39c. From the adder 39c, a detection signal S1 that is an intervention signal (a beat signal) representing a frequency difference between the Brillouin scattering light LS and the reference light LR is output.

The frequency analyzer 40 performs a frequency analysis of the detection signal S1 output from the light detector 39. In other words, the frequency analyzer 40 acquires a Brillouin gain spectrum from the detection signal S1 output from the light detector 39. The frequency analyzer 40, for example, includes a spectrum analyzer (Electrical Spectrum analyzer (ESA)). The frequency analyzer 40 takes in the detection signal S1 output from the light detector 39 during a period defined using a time gate method. In accordance with this, even when a plurality of correlation peaks is present in the optical fiber under test FUT, characteristics of the optical fiber under test FUT can be measured without any problem.

In addition, the frequency analyzer 40 may be configured to include a time axis measurer such as an oscilloscope and a transformer performing a fast Fourier transform (FFT) in place of the spectrum analyzer. The frequency analyzer 40 having such a configuration transforms data, which is continuous in time, acquired by the time axis measurer into spectrum data using the transformer.

The second harmonic component detector 41 converts a Brillouin gain spectrum output from the frequency analyzer 40 into a digital signal and then detects a second harmonic component included in the Brillouin gain spectrum. Here, the second harmonic component is a component having a frequency (2 fm) that is twice the modulation frequency fm of continuous light L1. The reason for detecting such a second harmonic component is to perform stable measurement in a time shorter than that of a conventional case by eliminating a noise superimposed in the Brillouin gain spectrum acquired by the frequency analyzer 40 and inhibiting variations of a baseline.

This second harmonic component represents an intensity at the frequency (2 fm) of the Brillouin gain spectrum acquired by the frequency analyzer 40 and has a magnitude changing in accordance with a position of the optical fiber under test FUT at which the Brillouin gain spectrum has been acquired. For example, in a case in which the Brillouin gain spectrum acquired by the frequency analyzer 40 is acquired at a position at which a correlation peak appears, the magnitude of the second harmonic component is the largest.

The second harmonic component detector 41 includes the signal detecting device 2 illustrated in FIG. 4. A Brillouin gain spectrum acquired by the frequency analyzer 40 is input to the signal detecting device 2 as a measurement signal MS, and a start trigger signal TS output from the signal generator 30 is also input to the signal detecting device 2. When the start trigger signal TS is input, the signal detecting device 2 generates a reference signal RS having a frequency that is twice the modulation frequency of modulation light and an index signal IS and detects a second harmonic component.

The measurer 42 measures characteristics of the optical fiber under test FUT on the basis of the Brillouin gain spectrum that has been converted into a digital signal by the second harmonic component detector 41 and the second harmonic component detected by the second harmonic component detector 41. More specifically, the measurer 42 acquires a peak frequency of the Brillouin gain spectrum by performing digital processing using the Brillouin gain spectrum that has been converted into a digital signal by the second harmonic component detector 41 and the second harmonic component detected by the second harmonic component detector 41. Then, a Brillouin frequency shift amount is acquired from the acquired peak frequency, and this Brillouin frequency shift amount is converted into a magnitude of distortion and a temperature change applied to the optical fiber under test FUT. In addition, the measurer 42 may include a display that displays a second harmonic component detected by the second harmonic component detector 41, characteristics of the measured optical fiber under test FUT (for example, a distortion distribution), and the like. For example, the display is a liquid crystal display, an organic electroluminescence (EL) display device, or the like.

In this example, first, continuous light L1 for which frequency modulation has been performed is split into pump light LP and reference light LR, the pump light LP is transformed into pump pulse light P, then, the pump pulse light is incident from one end of the optical fiber under test FUT, and Brillouin scattering light LS generated inside the optical fiber under test is acquired. Next, interference light between the Brillouin scattering light LS and the reference light LR is detected, and a Brillouin gain spectrum that is a spectrum of the Brillouin scattering light is acquired. Then, a second harmonic component having a frequency that is twice the modulation frequency of the modulation light included in the acquired Brillouin gain spectrum is detected by the signal detecting device, and characteristics of the optical fiber under test are measured on the basis of the acquired Brillouin gain spectrum and the detected second harmonic component. In accordance with this, stable measurement can be performed in a time shorter than that of a conventional case.

As above, although the signal detecting device and the optical fiber characteristics measuring device according to embodiments have been described, the present invention is not limited to the embodiments described above, and changes can be freely made within the scope of the present invention. For example, the second harmonic component detector 41 (see FIG. 5) of the optical fiber characteristics measuring device MD described in the embodiments described above is configured to include the signal detecting device 2 according to the second example illustrated in FIG. 4. However, the second harmonic component detector 41 may be configured to include the signal detecting device 1 according to the first example illustrated in FIG. 1.

[Supplementary Note]

A signal detecting device (1, 2) of a first aspect of one or more embodiments may include: a multiplier (13) configured to multiply a measurement signal (MS) by a reference signal (RS); a filter processor (16) configured to perform filter processing on a multiplication result acquired by the multiplier; a first storage (17) configured to store an internal state of the filter processor; and a second storage (18) configured to store a processing result acquired by the filter processor. The filter processor may be configured to perform the filter processing using the internal state stored in the first storage. The first storage may be configured to perform switching of an area in/from which the internal state is written/read by the filter processor in accordance with an index signal (IS) representing a type of amplitude of a time-divisional signal (DS) included in the measurement signal. The second storage may be configured to perform switching of an area in which the processing result acquired by the filter processor is stored in accordance with the index signal.

In addition, the signal detecting device of a second aspect of one or more embodiments according to the first aspect may further include: a first converter (11) configured to convert the measurement signal into a digital signal; a second converter (12) configured to convert the reference signal into a digital signal; a detector (15) configured to detect a timing at which the index signal changes; and a re-sampler (14) configured to re-sample the multiplication result acquired by the multiplier at a timing detected by the detector.

Furthermore, the signal detecting device of a third aspect of the one or more embodiments according to the first or second aspect may further include: a measurement signal input terminal (T11) to which the measurement signal is input; a reference signal input terminal (T12) to which the reference signal is input; and an index signal input terminal (T13) to which the index signal is input.

In addition, the signal detecting device of a fourth aspect of one or more embodiments according to the first aspect may further include: a first generator (21) configured to generate the reference signal on the basis of a start trigger signal (TS) defining a start timing of the time-divisional signal, and configured to generate a timing signal (TM) representing a division timing of the time-divisional signal; and a second generator (22) configured to generate the index signal on the basis of the timing signal.

Furthermore, in the signal detecting device of a fifth aspect of one or more embodiments according to the fourth aspect, the first generator is configured to generate the reference signal as a digital signal, and the signal detecting device may further include: a first converter (11) configured to convert the measurement signal into a digital signal; and a re-sampler (14) configured to re-sample the multiplication result acquired by the multiplier at a division timing represented in the timing signal.

In addition, the signal detecting device of a sixth aspect of one or more embodiments according to the fourth or fifth aspect may further include: a measurement signal input terminal (T11) to which the measurement signal is input; and a start trigger signal input terminal (T14) to which the start trigger signal is input.

Furthermore, in the signal detecting device of a seventh aspect of one or more embodiments according to any one of the first to sixth aspects, the filter processor may be configured to perform a process using an infinite impulse response low pass filter as the filter processing.

In addition, in the signal detecting device of an eighth aspect of one or more embodiments according to first aspect, the first storage may be configured to set a new area as an area for storing the internal state of the filter processor when a value of the index signal is a new value.

In addition, in the signal detecting device of a ninth aspect of one or more embodiments according to first aspect, the second storage may be configured to set a new area as an area for storing the processing result acquired by the filter processor when a value of the index signal is a new value.

In addition, in the signal detecting device of a tenth aspect of one or more embodiments according to fourth aspect, after the start trigger signal is input, the first generator may be configured to generate the timing signal every time a period with which the amplitude of the time-divisional signal changes elapses.

An optical fiber characteristics measuring device (MD) of an eleventh aspect of one or more embodiments may include: a first optical splitter (32) configured to split modulation light (L1) for which frequency modulation has been performed into pump light (LP) and reference light (LR); a second optical splitter (36) configured to cause the pump light to be incident from one end of an optical fiber under test (FUT), and configured to output Brillouin scattering light (LS) generated inside the optical fiber under test; a first detector (39) configured to detect interference light between the Brillouin scattering light output from the second optical splitter and the reference light; an analyzer (40) configured to acquire a Brillouin gain spectrum that is a spectrum of the Brillouin scattering light from a detection signal (S1) output from the first detector; a second detector (41) configured to detect a second harmonic component having a frequency that is twice a modulation frequency of the modulation light included in the Brillouin gain spectrum acquired by the analyzer; and a measurer (42) configured to measure characteristics of the optical fiber under test on the basis of the Brillouin gain spectrum acquired by the analyzer and the second harmonic component detected by the second detector. The second detector may include the signal detecting device according to any one of the first to tenth aspects to which the Brillouin gain spectrum acquired by the analyzer is input as the measurement signal and which detects the second harmonic component using the reference signal having the frequency that is twice the modulation frequency of the modulation light.

In addition, in the optical fiber characteristics measuring device of a twelfth aspect of one or more embodiments according to the eleventh aspect, the signal detecting device may further include: a first converter (11) configured to convert the measurement signal into a digital signal; a second converter (12) configured to convert the reference signal into a digital signal; a detector (15) configured to detect a timing at which the index signal changes; and a re-sampler (14) configured to re-sample the multiplication result acquired by the multiplier at a timing detected by the detector.

Furthermore, in the optical fiber characteristics measuring device of a thirteenth aspect of one or more embodiments according to the eleventh or twelfth aspect, the signal detecting device may further include: a measurement signal input terminal (T11) to which the measurement signal is input; a reference signal input terminal (T12) to which the reference signal is input; and an index signal input terminal (T13) to which the index signal is input.

In addition, in the optical fiber characteristics measuring device of a fourteenth aspect of one or more embodiments according to the eleventh aspect, the signal detecting device may further include: a first generator (21) configured to generate the reference signal on the basis of a start trigger signal (TS) defining a start timing of the time-divisional signal, and configured to generate a timing signal (TM) representing a division timing of the time-divisional signal; and a second generator (22) configured to generate the index signal on the basis of the timing signal.

Furthermore, in the optical fiber characteristics measuring device of a fifteenth aspect of one or more embodiments according to the fourteenth aspect, the first generator is configured to generate the reference signal as a digital signal, and the signal detecting device may further include: a first converter (11) configured to convert the measurement signal into a digital signal; and a re-sampler (14) configured to re-sample the multiplication result acquired by the multiplier at a division timing represented in the timing signal.

In addition, in the optical fiber characteristics measuring device of a sixteenth aspect of one or more embodiments according to the fourteenth or fifteenth aspect, the signal detecting device may further include: a measurement signal input terminal (T11) to which the measurement signal is input; and a start trigger signal input terminal (T14) to which the start trigger signal is input.

Furthermore, in the optical fiber characteristics measuring device of a seventeenth aspect of one or more embodiments according to any one of the eleventh to sixteenth aspects, the filter processor may be configured to perform a process using an infinite impulse response low pass filter as the filter processing.

In addition, in the optical fiber characteristics measuring device of an eighteenth aspect of one or more embodiments according to eleventh aspect, the first storage may be configured to set a new area as an area for storing the internal state of the filter processor when a value of the index signal is a new value.

In addition, in the optical fiber characteristics measuring device of a nineteenth aspect of one or more embodiments according to eleventh aspect, the second storage may be configured to set a new area as an area for storing the processing result acquired by the filter processor when a value of the index signal is a new value.

In addition, in the optical fiber characteristics measuring device of a twentieth aspect of one or more embodiments according to fourteenth aspect, after the start trigger signal is input, the first generator may be configured to generate the timing signal every time a period with which the amplitude of the time-divisional signal changes elapses.

According to one or more embodiments, there is an advantage of being able to separate and detect amplitudes of a time-divisional signal of which the amplitude time-divisionally changes.

As used herein, the following directional terms "front, back, above, downward, right, left, vertical, horizontal, below, transverse, row and column" as well as any other similar directional terms refer to those instructions of a device equipped with one or more embodiments. Accordingly, these terms, as utilized to describe one or more embodiments should be interpreted relative to a device equipped with one or more embodiments.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While embodiments have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A signal detecting device comprising:
    a multiplier that multiplies a measurement signal by a reference signal;
    a filter that filters a multiplication result from the multiplier;
    a first storage that stores an internal state of the filter; and
    a second storage that stores a filtering result from the filter, wherein
    the filter filters the multiplication result using the internal state stored in the first storage,
    the first storage switches an area in or from which the filter writes or reads the internal state in accordance with an index signal representing a type of amplitude of a time-divisional signal in the measurement signal, and
    the second storage switches an area in which the filtering result is stored in accordance with the index signal.

2. The signal detecting device according to claim 1, further comprising:
    a first converter that converts the measurement signal into a digital signal;
    a second converter that converts the reference signal into a digital signal;
    a detector that detects a timing at which the index signal changes; and
    a re-sampler that re-samples the multiplication result at the detected timing.

3. The signal detecting device according to claim 2, further comprising:
    a measurement signal input terminal to which the measurement signal is input;
    a reference signal input terminal to which the reference signal is input; and
    an index signal input terminal to which the index signal is input.

4. The signal detecting device according to claim 1, further comprising:
    a first generator that generates:
        the reference signal based on a start trigger signal defining a start timing of the time-divisional signal, and
        a timing signal representing a division timing of the time-divisional signal; and
    a second generator that generates the index signal based on the timing signal.

5. The signal detecting device according to claim 4, wherein
    the first generator generates the reference signal as a digital signal, and
    the signal detecting device further comprises:
        a first converter that converts the measurement signal into a digital signal; and
        a re-sampler that re-samples the multiplication result at the division timing in the timing signal.

6. The signal detecting device according to claim 5, further comprising:
    a measurement signal input terminal to which the measurement signal is input; and
    a start trigger signal input terminal to which the start trigger signal is input.

7. The signal detecting device according to claim 1, wherein the filter performs an infinite impulse response low pass filter in the filtering.

8. The signal detecting device according to claim 1, wherein the first storage sets a new area for storing the internal state of the filter when a value of the index signal is a new value.

9. The signal detecting device according to claim 1, wherein the second storage sets a new area for storing the filtering result when a value of the index signal is a new value.

10. The signal detecting device according to claim 4, wherein after the start trigger signal is input, the first generator generates the timing signal every time a period, with which the amplitude of the time-divisional signal changes, elapses.

11. An optical fiber characteristics measuring device comprising:
  a first optical splitter that splits modulation light, for which frequency modulation has been performed, into pump light and reference light;
  a second optical splitter that causes the pump light to be incident from one end of an optical fiber under test and outputs Brillouin scattering light generated inside the optical fiber;
  a first detector that detects interference light between the reference light and the Brillouin scattering light output from the second optical splitter;
  an analyzer that acquires a Brillouin gain spectrum that is a spectrum of the Brillouin scattering light from a detection signal output from the first detector;
  a second detector that detects a second harmonic component having a frequency that is twice a modulation frequency of the modulation light in the acquired Brillouin gain spectrum; and
  a measurer that measures characteristics of the optical fiber based on the acquired Brillouin gain spectrum and the detected second harmonic component, wherein
  the second detector comprises the signal detecting device according to claim 1 to which the acquired Brillouin gain spectrum is input as the measurement signal and that detects the second harmonic component using the reference signal having the frequency that is twice the modulation frequency of the modulation light.

12. The optical fiber characteristics measuring device according to claim 11, wherein the signal detecting device comprises:
  a first converter that converts the measurement signal into a digital signal;
  a second converter that converts the reference signal into a digital signal;
  a detector that detects a timing at which the index signal changes; and
  a re-sampler that re-samples the multiplication result at the detected timing.

13. The optical fiber characteristics measuring device according to claim 12, wherein the signal detecting device further comprises:
  a measurement signal input terminal to which the measurement signal is input;
  a reference signal input terminal to which the reference signal is input; and
  an index signal input terminal to which the index signal is input.

14. The optical fiber characteristics measuring device according to claim 11, wherein the signal detecting device comprises:
  a first generator that generates:
    the reference signal based on a start trigger signal defining a start timing of the time-divisional signal, and
    a timing signal representing a division timing of the time-divisional signal; and
  a second generator that generates the index signal based on the timing signal.

15. The optical fiber characteristics measuring device according to claim 14, wherein
  the first generator generates the reference signal as a digital signal, and
  the signal detecting device further comprises:
    a first converter that converts the measurement signal into a digital signal; and
    a re-sampler that re-samples the multiplication result at the division timing in the timing signal.

16. The optical fiber characteristics measuring device according to claim 15, wherein the signal detecting device further comprises:
  a measurement signal input terminal to which the measurement signal is input; and
  a start trigger signal input terminal to which the start trigger signal is input.

17. The optical fiber characteristics measuring device according to claim 11, wherein the filter performs an infinite impulse response low pass filter in the filtering.

18. The optical fiber characteristics measuring device according to claim 11, wherein the first storage sets a new area for storing the internal state of the filter when a value of the index signal is a new value.

19. The optical fiber characteristics measuring device according to claim 11, wherein the second storage sets a new area for storing the filtering result when a value of the index signal is a new value.

20. The optical fiber characteristics measuring device according to claim 14, wherein after the start trigger signal is input, the first generator generates the timing signal every time a period, with which the amplitude of the time-divisional signal changes, elapses.

\* \* \* \* \*